(12) United States Patent  
Tan

(10) Patent No.: US 6,719,285 B2
(45) Date of Patent: Apr. 13, 2004

(54) AUTOMATIC DOCUMENT FEEDER AND SCANNER SYSTEMS

(75) Inventor: Hin Leong Tan, Sunnyvale, CA (US)

(73) Assignee: Electronic Document Technology Pte. Ltd., Singapore (SG)

( * ) Notice: Subject to any disclaimer, the term of this patent is extended or adjusted under 35 U.S.C. 154(b) by 0 days.

(21) Appl. No.: 10/071,937

(22) Filed: Feb. 5, 2002

(65) Prior Publication Data

US 2003/0146560 A1 Aug. 7, 2003

(51) Int. Cl.⁷ .................................................. B65H 3/06
(52) U.S. Cl. ...................... 271/117; 271/10.11; 271/114; 271/116
(58) Field of Search ................................ 271/110, 127, 271/10.11, 117, 4.1, 116, 114

(56) References Cited

U.S. PATENT DOCUMENTS

| | | | |
|---|---|---|---|
| 5,083,766 A | 1/1992 | Osawa | 271/121 |
| 5,555,105 A | 9/1996 | Shahir et al. | 358/473 |
| 5,604,640 A | 2/1997 | Zipf et al. | 359/803 |
| 5,622,364 A * | 4/1997 | Dutton et al. | 271/117 |
| 5,878,319 A | 3/1999 | Itoh | 399/367 |
| 5,879,002 A * | 3/1999 | Nakamura et al. | 271/10.11 |
| 5,890,710 A | 4/1999 | Phillips et al. | 271/124 |
| 6,270,072 B1 | 8/2001 | Louie | 271/157 |

* cited by examiner

Primary Examiner—Donald P. Walsh
Assistant Examiner—Kaitlin Joerger
(74) Attorney, Agent, or Firm—Robert Moll

(57) ABSTRACT

The present invention relates to an automatic document feeder for manipulating and scanning multiple documents, sheets, cards and sheet-like substrates. The present invention is especially suitable for automatic feeding and scanning of a stack of business cards or other material, which is sufficiently rigid. In an embodiment, a card feeder includes a vertically movable pickup roller, a backstop incline, and output rollers. The card feeder uses the pickup roller to separate and push the top card of the stack against a backstop incline. The card slides upwards along the incline until it engages the output rollers, which move the card past a scanner. The present invention relates to embodiments, which transfer an output card to a card scanner using output rollers to push the card toward scanner input rollers. The output rollers and scanner input rollers can be synchronized or the output rollers can freely rotate in one direction after power to a motor driving rotation is cut off. This allows the scanner input roller(s) to pull the card through or by the output roller(s) into the scanner without synchronization during the scanning.

10 Claims, 8 Drawing Sheets

AUTOMATIC DOCUMENT FEEDER AND SCANNER SYSTEMS

BACKGROUND OF THE INVENTION

The present invention relates to automatic document feeders and scanners, and in particular those suitable for feeding and scanning multiple cards.

Computer printers, scanners, and copiers employ automatic documents feeders to feed multiple sheets of paper from a stack one sheet at a time into position for printing, scanning, copying, and the like. Of course, this saves time hand feeding each sheet. Automatic document feeders such as those found in printers or copier typically have an open tray for holding the stack of paper in horizontal alignment, and a spring-loaded mechanism for keeping the top sheet of the stack at the right height for an extractor mechanism, which pulls each sheet from the stack.

The automatic document feeder described is not suitable for handling a stack of cards, however, because of the typical thickness, texture and material of the cards, and particularly those with raised or embossed printing on one or both sides of the card. Such raised or embossed lettering generates a high coefficient of friction between adjacent cards, which results in cards sticking to each other. Thus, the automatic document feeder is unable to pull one card from the stack at a time. Either the document feeder will pull off more than one card or possibly no cards at all. There are systems for scanning and digitizing a single business card such as U.S. Pat. No. 5,604,640, which is incorporated by reference. However, the user must hand feed the system one card at a time. Of course, any of the results are unworkable, for example, for automatically scanning a stack of business cards one might acquire during a business trip.

SUMMARY OF THE INVENTION

The present invention relates to an automatic document feeder for manipulating and scanning multiple documents, sheets, cards and sheet-like substrates. The document feeder may be in a separate or integrated housing with the scanner. In one embodiment, a card feeder includes at least one pickup roller, which is vertically movable, a backstop incline, and output roller(s). The card feeder separates the top card from the remainder of the card stack by using the pickup roller to push the top card of the stack against a backstop incline. The card slides upwards along the incline until it engages output roller(s), which move the card past a scanner.

The present invention relates to mechanisms, which transfer a card across a scanner. The embodiments use one or more output rollers that rotate to push the card toward one or more scanner input rollers. The output roller(s) and scanner input roller(s) can be synchronized or the output roller(s) can freely rotate when the motor driving their rotation is cut off. This allows the scanner input roller(s) to pull the card through or by the output roller(s) into the scanner without synchronization during the scanning process.

The invention relates to embodiments of an automatic document feeder, which can be used with scanners. In others, the invention relates to integrated document feeder and scanner systems. In one embodiment, the feeder is a complete unit that provides not only a housing for the card stack, but includes miniature rollers, motors, and assembly for extracting and feeding individual cards from an input card stack. The feeder can be compact and self-contained unit, suitable for use with small hand-held scanners.

The present invention is suitable for automatic feeding and scanning of business cards, as well as other substrates, sheets, and materials having a coefficient of friction, which tends to resist separation of the cards from each other yet have sufficient rigidity to separate the top substrate, card or sheet from the underlying stack as described.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is best determined by reference to the claims.

Figure 1:
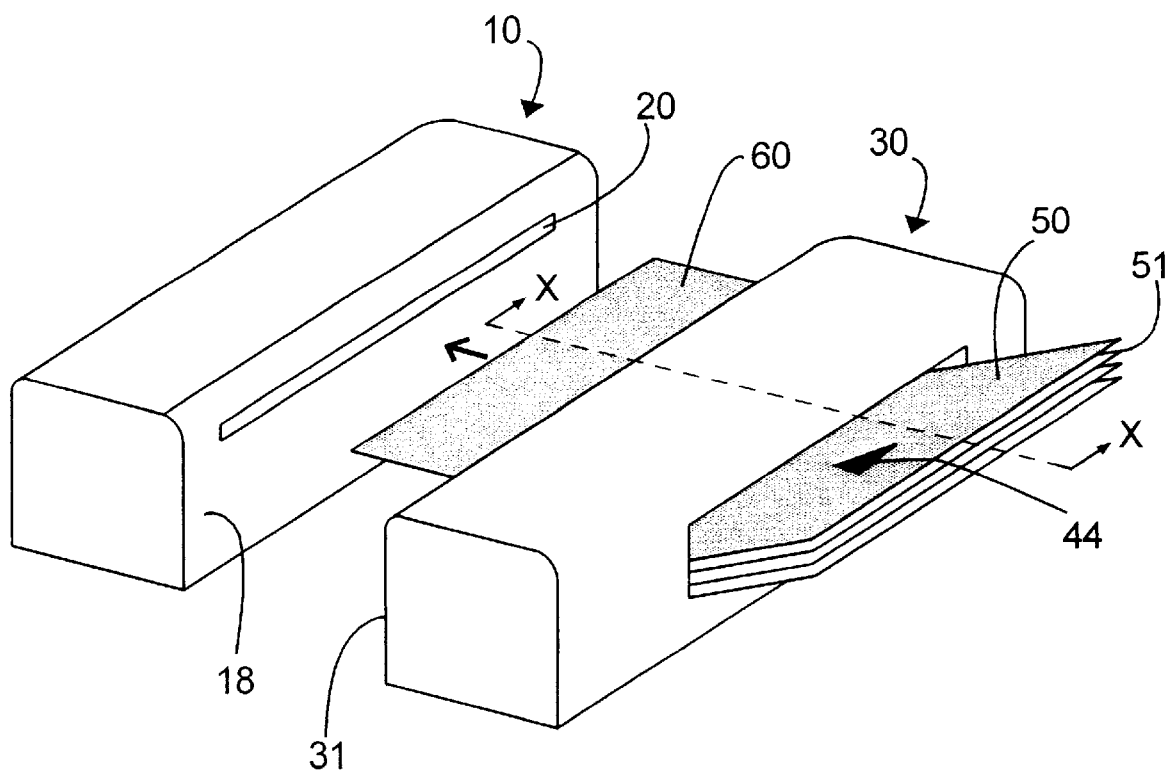
FIG. 1 is an isometric view of an embodiment of a card scanner and card feeder to illustrate the use of the card feeder in feeding a stack of cards. The spacing between feeder and scanner and the thickness of the cards are exaggerated for clarity.

FIG. 1 illustrates an embodiment of a card scanner 10 and a card feeder 30. The spacing between the card scanner 10 and the card feeder 30 is exaggerated for clarity. The card feeder 30 has a feeder entrance 44 into which preferably a stack of cards can be inserted. The card feeder 30 sequentially lifts each card, beginning from the top card 50 of the stack and ejects it through an output of the feeder back surface 31. The output card 60 is then fed to input 20 of the card scanner 10 to scan the card. Typically, a suitable conventional locking mechanism will hold the card scanner 10 and card feeder 30 adjacent to each other for proper alignment. In one embodiment, the back surface 31 of the card feeder touches or is held in close proximity to the scanner front surface 18. In another set of embodiments, a combined housing holds the card scanner 10 and the card feeder 30.

Figure 2A:
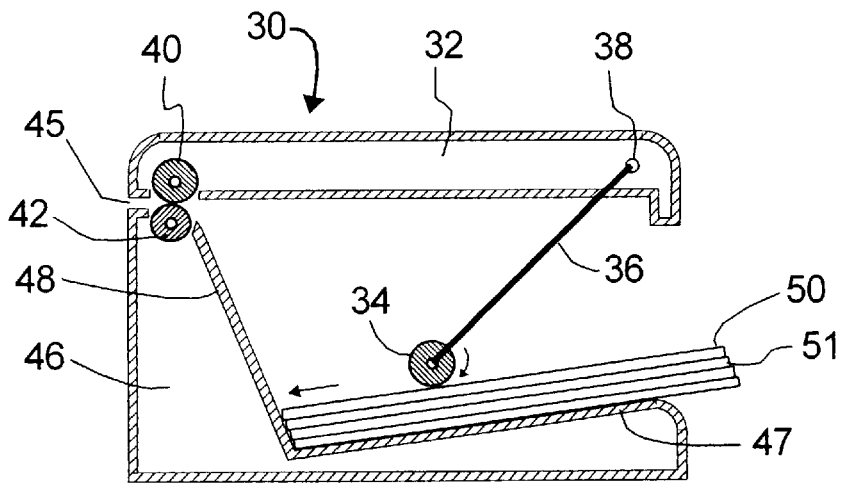
FIGS. 2A–2C are cross-sectional views along line X—X in FIG. 1 illustrating one embodiment of the card feeder in operation.
Figure 2B:
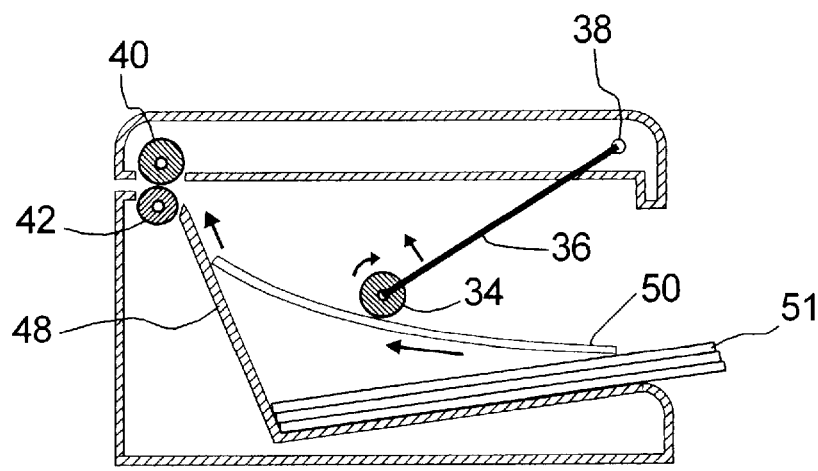
Figure 2C:
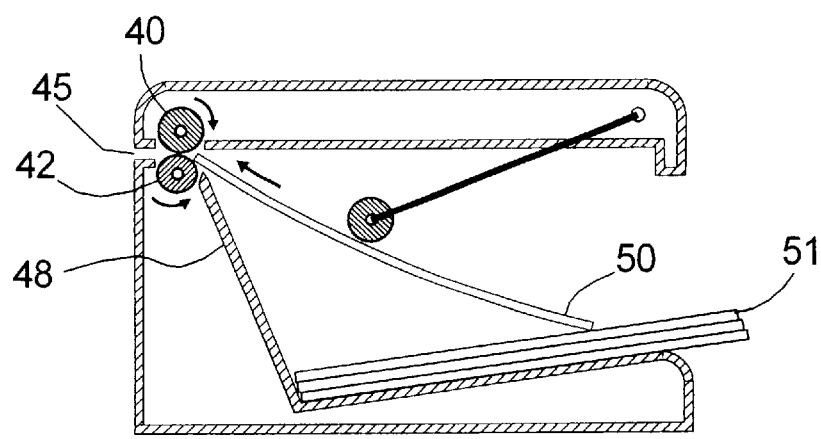

FIGS. 2A–2C are cross-sectional views along line X—X of FIG. 1 illustrating the operation of one embodiment of the card feeder 30. Referring to FIG. 2A, the card feeder 30 includes an upper housing 32 and a lower housing 46 (collectively called "the housing"). The upper housing 32 and lower housing 46 are convenient structures for holding and positioning the moving parts and for rigidity, but not essential to the invention. Attached to the upper housing 32 is a swing arm 36, which pivots about a swing arm axle 38. A pickup roller 34 of rubber or another material capable of gripping the cards is rotatably attached to the lower end of the swing arm 36. A conventional DC motor (not shown) drives the pickup roller 34 by means of a conventional pulley and belt arrangement or by a gear train (see FIG. 11). This motor termed the pickup motor can be a stepper or a DC motor. The pickup roller 34 rests on the top card 50 of the input card stack. The card stack rests on card input platform 47, which can be horizontal or inclined downwards as shown in FIG. 2A. The front edge of each card of the stack leans against the backstop incline 48. The backstop incline 48 is set up such that the top of the incline leads into the nip defined between the upper output roller 40 and lower output roller 42. In one embodiment, the system provides a second conventional motor (also not shown) to drive the output rollers 40 and 42 independently from the pickup roller 34. This second motor will be referred to as the output motor to distinguish it from the pickup motor.

In operation, the card feeder 30 moves the top card 50 from the input card stack to the feeder exit 45. The sequence of the operation is shown in FIG. 2A, FIG. 2B, and FIG. 2C. Referring to FIG. 2A, the top card 50 rests on the second card 51, and the front edge of the top card 50 leans against the backstop incline 48. The pickup roller 34 rests on the top card 50. Power applied to the pickup motor drives the pickup roller 34, and causes it to rotate in a clockwise direction. Concurrently or shortly after, power is applied to the output motor to drive the output rollers 40 and 42, causing the top output roller 40 to rotate clockwise, and the lower output roller 42 to rotate counter-clockwise.

Referring to FIGS. 2A–2B, as the pickup roller 34 rotates clockwise, the traction of the pickup roller 34 on the top card 50 will push the top card 50 forward against the backstop incline 48. This will force the front edge of the top card 50 to slide upwards along the backstop incline 48 as shown in FIG. 2B. As the top card 50 slides upwards, it will separate from the second card 51, which due to its weight, will tend to remain on the input card stack. As the pickup roller 34 rotates, the front edge of the top card 50 will progressively slide up along the backstop incline 48. As the front edge of the card slides up, the center portion of the top card 50, which is semi-rigid will move upwards, lifting the pickup roller 34 upwards with it. The pickup roller 34 is mounted to the swing arm 36, which is rotatably attached to the upper housing 32 in a way that allows it to move vertically as the top card 50 rises.

Referring to FIG. 2C, the top card 50 continues to slide forward and upward on the backstop incline 48 until the front edge of the card enters the nip between output rollers 40 and 42. The output rollers 40 and 42 grip the front edge of the card and push it out through the feeder exit 45. In one embodiment, as the top card 50 moves through the feeder exit 45, a sensor (not shown) detects the top card 50 and shuts off power to the pickup motor driving the pickup roller 34. The output motor driving output rollers 40 and 42 continues to operate, however, and pushes the top card 50 through the feeder exit 45 into the card scanner 10 as shown in FIG. 1.

Figure 3A:
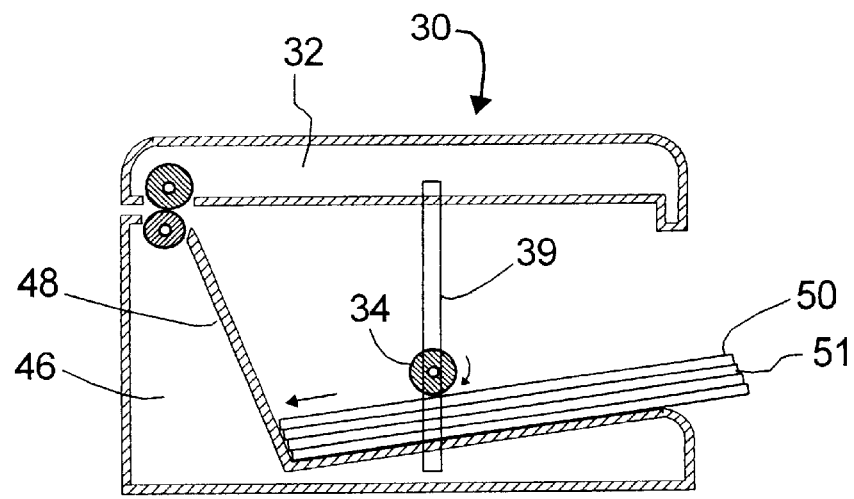
FIGS. 3A–3C are cross-sectional views along line X—X in FIG. 1 illustrating another embodiment of the card feeder in operation.
Figure 3B:
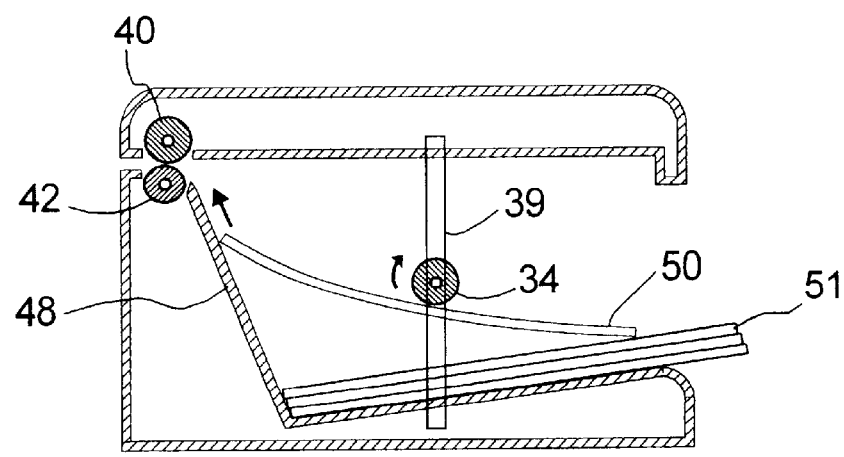
Figure 3C:
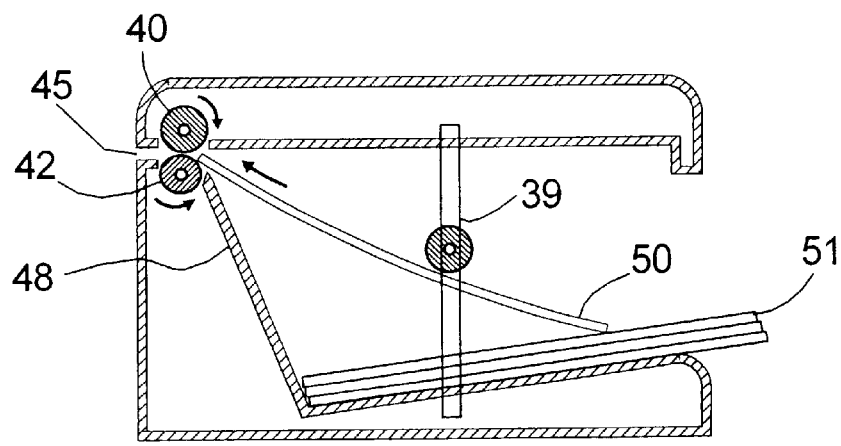

FIG. 3A is a cross-sectional view of another embodiment of the card feeder 30 along section view line X—X in FIG. 1. This embodiment is similar to the previous embodiment shown in FIG. 2A, except in the way in which the pickup roller 34 is mounted. Referring to FIG. 3A, the pickup roller 34 slides freely on a vertical roller guide 39 which is mounted to the upper and lower housing 32 and 46. The pickup roller 39 moves freely along the roller guide 39, and rests on the top card 50 of the input card stack. The principle of operation of the card feeder in this embodiment shown in FIGS. 3A–3C is the same as that of the previous embodiment shown in FIGS. 2A–2C.

Referring to FIG. 3A, as the pickup roller 34 rotates in a clockwise direction, it pushes the front edge of top card 50 forward against the backstop incline 48. This causes the front edge of top card 50 to slide upwards along the incline. The second card 51 will remain on the input card stack due to its weight. The upward movement of the top card 50 causes the pickup roller 34 (FIG. 3B) to slide upwards along the roller guide 39. The top card 50 continues to slide up the backstop incline 48 until it reaches the nip between the output rollers 40 and 42 (FIG. 3C). The output rollers 40 and 42 grip the card and push it out through the feeder exit 45. As the card enters the feeder exit 45, a sensor (not shown) located in the feeder exit 45 detects the card and shuts off power to the pickup motor driving the pickup roller 34. The output motor driving output rollers 40 and 42 continues to operate and pushes the card through the feeder exit 45 into a card scanner such as that shown in FIGS. 1 and 5–10.

Figure 4:
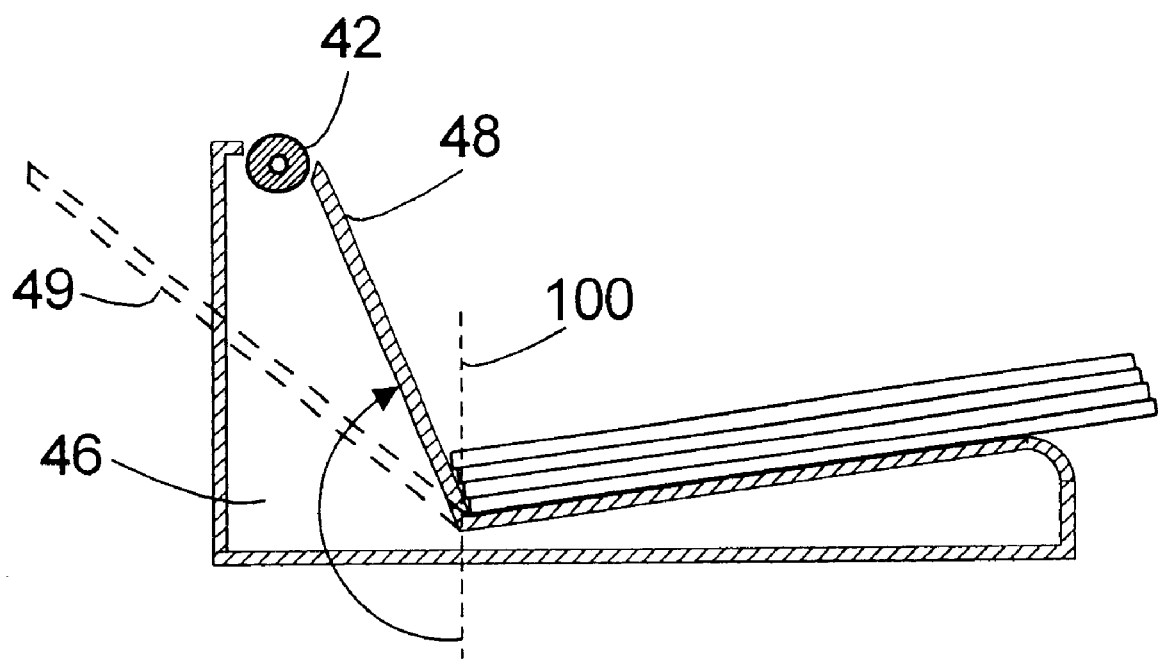
FIG. 4 illustrates a portion of the card feeder including the card input platform and the backstop incline. In these embodiments, the backstop incline can be set at various angles depending on requirements and the type of substrate being scanned.

The optimum angle of incline of the backstop incline 48 depends on the thickness and flexibility of the card material to be fed through the card feeder 30. Referring to FIG. 4, the angle is measured from the vertical reference line 100 to the backstop incline 48 in a clockwise direction. For business cards, a desirable range of angles for the incline is anywhere between about 125 to 179 degrees. However, the angle of incline used is not essential to the invention. It is understood that one of ordinary skill could determine the angle of incline to use after review of the specification given the stock, grade, lettering, raised or embossed, and texture of card or substrate being fed and scanned. The dotted line 49 illustrates one lower position for the backstop incline 48.

Figure 5:
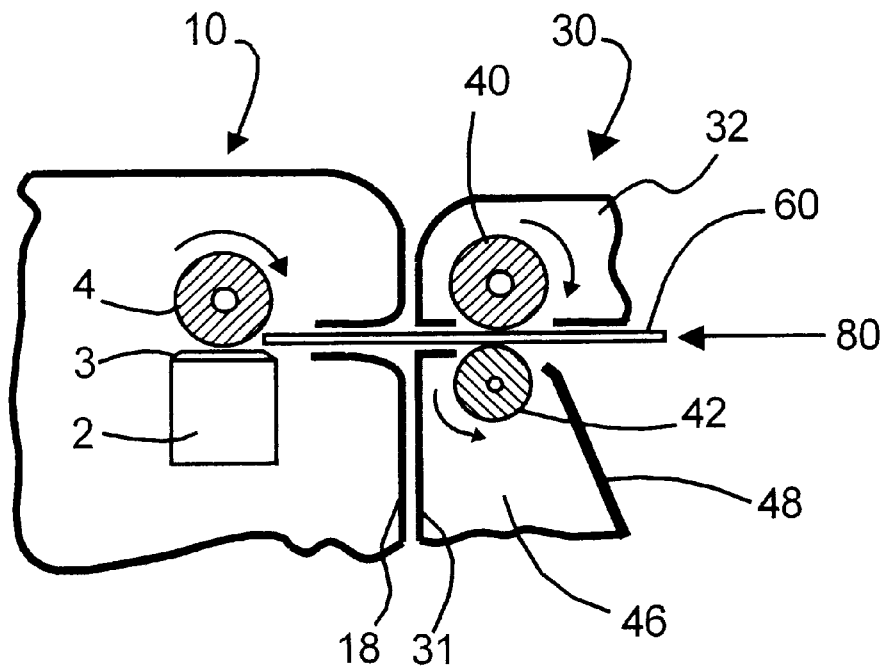
FIG. 5 illustrates one system of moving a card from a card feeder into a card scanner that has a single roller above a scan module.
Figure 6:
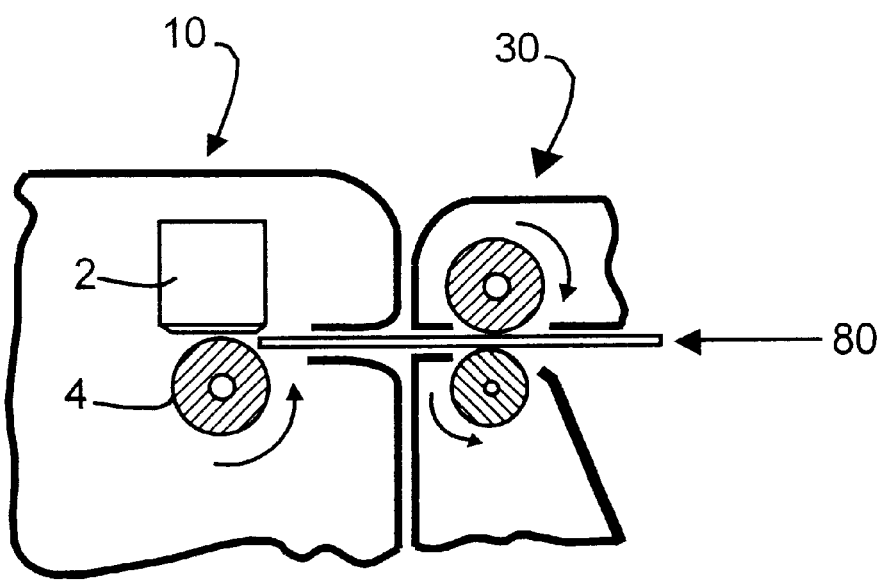
FIG. 6 illustrates another system of moving a card from a card feeder into a card scanner that has a scan module above a single roller.

FIG. 5 shows an embodiment of a mechanism and method of feeding an output card 60 from the feeder exit 45 into the card scanner 10. The elements of the card scanner 10 are the input roller 4, the scanning module 2, which may include a scanning element inside a housing, and a scanning glass 3. The input roller 4 may be mounted above the scanning module 2 as shown in FIG. 5, or below the scanning module 2, as shown in FIG. 6. In an embodiment, a sensor (not shown in figure) is disposed in front of the input roller 4 to detect the presence of an output card 60. The elements of the card feeder 30 are as previously described.

Referring to FIG. 5, the elements of the card feeder 30 for moving the output card 60 into the card scanner 10 are the upper output roller 40 and the lower output roller 42. These two rollers are preferably spring mounted in the upper housing 32 and lower housing 46 in such a way that the rollers touch along a parallel axis. The rollers may be separated slightly by a card passing between them. The output motor driving these two output rollers 40, 42 is coupled to the rollers by means of a conventional gear drive that allows the rollers to rotate freely in one direction even when the motor is stopped. Functionally, this acts much like a ratchet wrench, which is driven in one direction of rotation and spins free in the other. The torque generated by the motor can be supplied to either the upper output roller 40 or the lower output roller 42, or both of the output rollers 40 and 42 simultaneously.

In one embodiment, the output motor can drive the lower output roller 42 in a counter-clockwise direction. The upper output roller 40 can be a non-driven freely rotating roller, which provides pressure on the output card 60 to ensure firm contact between the output card 60 and the lower output roller 42 as the card is pushed forward by the driven lower output roller 42. The lower output roller 42 is coupled to the motor in such a way that the roller 42 can continue to rotate freely in a counter-clockwise direction when the motor is stopped.

In another embodiment, the output motor drives the upper output roller 40 in a clockwise direction and the lower output roller 42 is a freely rotating roller. The upper output roller 40 is coupled to the motor in such a way that it can continue to rotate freely in a clockwise direction when the motor is stopped.

In another embodiment, torque from the motor is supplied simultaneously to both the upper and lower output rollers 40 and 42. When the motor driving the rollers is stopped, the coupling to the rollers is such that the upper output roller 40 can continue to rotate freely in a clockwise direction, and the lower output roller 42 can rotate freely in a counter-clockwise direction.

FIGS. 5 and 6 show the method of moving the card from the card feeder 30 to the card scanner 10. Referring to FIG. 5, the input roller 4 is initially stationary. The output motor (not shown) turns the output rollers 40 and/or 42, which moves output card 60 in direction 80 until it lodges firmly into the nip between the input roller 4 and the scanning glass 3. The output motor is then stopped. Next, the scanner motor turns the input roller 4, which pulls the card across the scanning glass for the scanning process. Although the output motor is stopped, the output rollers 40 and 42 continue to rotate freely as output card 60 is pulled out of the card feeder 30 into the card scanner 10 by the rotating input roller 4. In another mode of operation, the output motor does not stop but continues to operate as the output card 60 engages input roller 4, and the output rollers 40 and 42 rotate in synchronization with the input roller 4.

Figure 7:
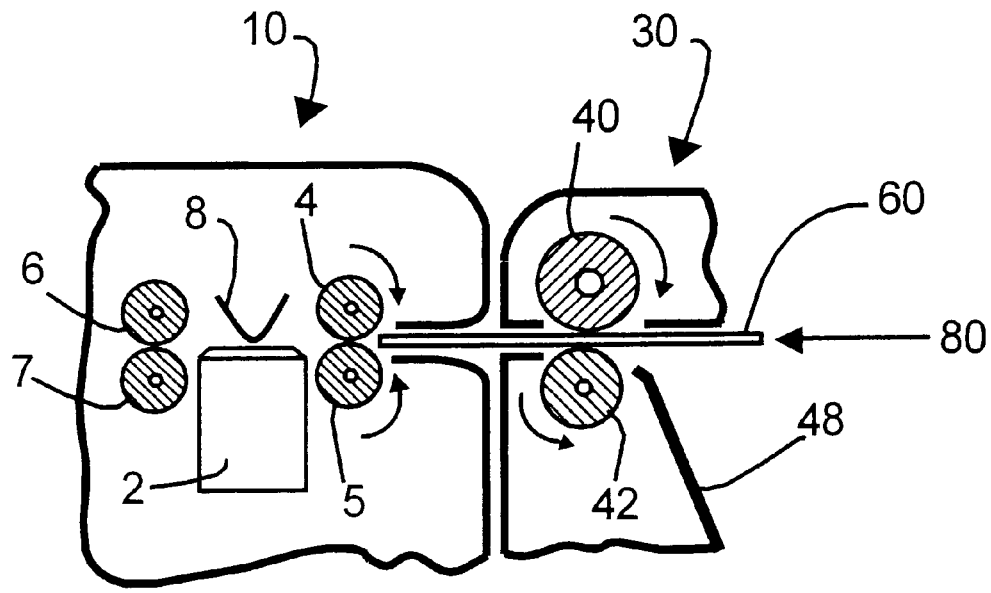
FIG. 7 illustrates another system of moving a card from a card feeder into a card scanner that has multiple rollers.

In FIG. 7, the card scanner 10 includes a pair of input rollers 4 and 5, instead of the single input roller 4 of the card scanner 10 shown in FIG. 5. A pressure plate 8 is placed above the scanning module 2 to keep the card 60 in contact with the scanning module 2 during the scanning. The method of moving the card 60 from the card feeder 30 to the card scanner 10 is similar to that of FIG. 5. Referring to FIG. 7, the output rollers 40 and 42 move the card 60 into the nip between input rollers 4 and 5. The output motor is then stopped. Next the input rollers 4 and 5 of the card scanner 10 rotate, pulling the card 60 from the card feeder 30 and pushing it across the scanning module 2. Eject rollers 6 and 7 grip the card 60 as it moves across the scanning module 2, and moves it out of the card scanner 10. In another mode of operation, the output motor does not stop, but continues to operate as the output card 60 engages input rollers 4 and 5, and the output rollers 40 and 42 rotate in synchronization with the input rollers 4 and 5.

Figure 8:
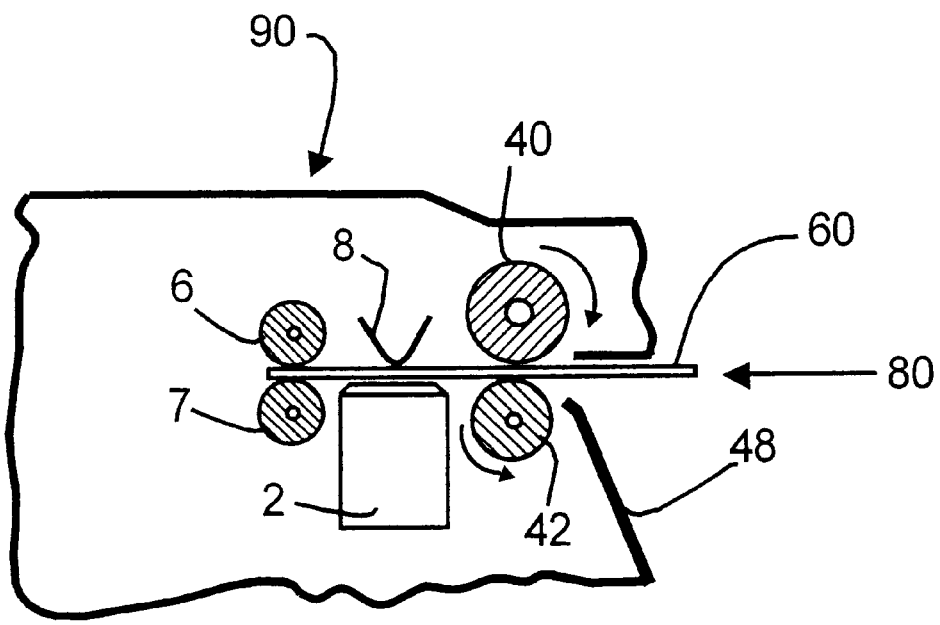
FIG. 8 shows a cross-sectional view of a combined housing of a card scanner and feeder device.

The parts of the card scanner 10 and card feeder 30 previously described and shown in FIGS. 5–7 can be installed in a combined housing go as shown in FIG. 8. The backstop incline 48, and the output rollers 40 and 42 of the combined housing go perform the same functions and operate in the same way as the corresponding parts in the card feeder 30 shown in FIGS. 5–7. To illustrate one of those embodiments, referring to FIG. 8, the output rollers 40 and 42 rotate in synchronized speed with the upper and lower eject rollers 6 and 7. The output rollers 40 and 42 move card 60 across the scanning module 2. The upper and lower eject rollers 6 and 7 grip the card as it moves across the scanning module and push it out of the combined housing go.

Figure 9:
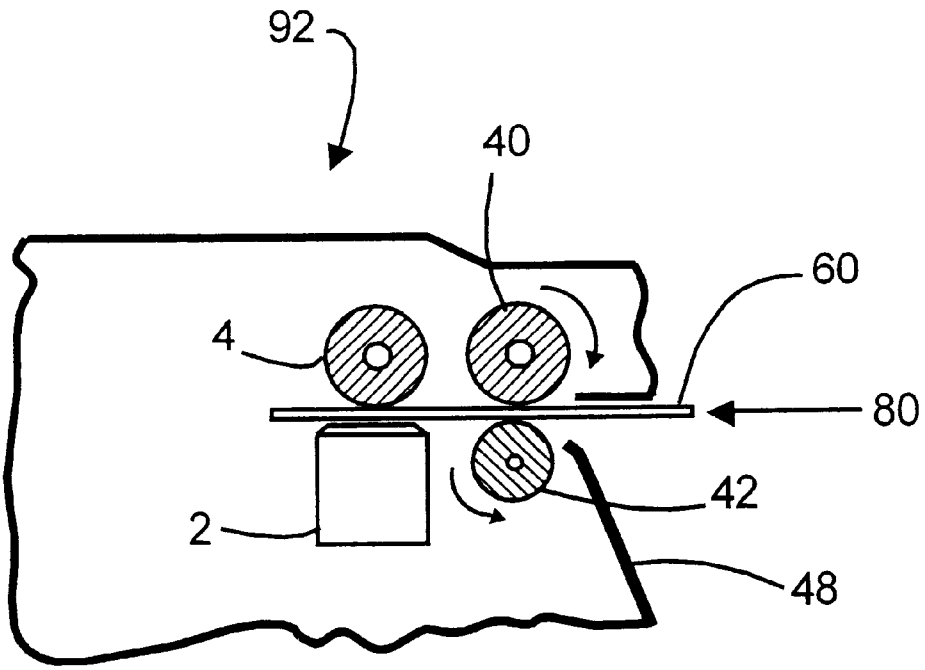
FIG. 9 shows a cross-sectional view of a combined housing of a card scanner and feeder device.
Figure 10:
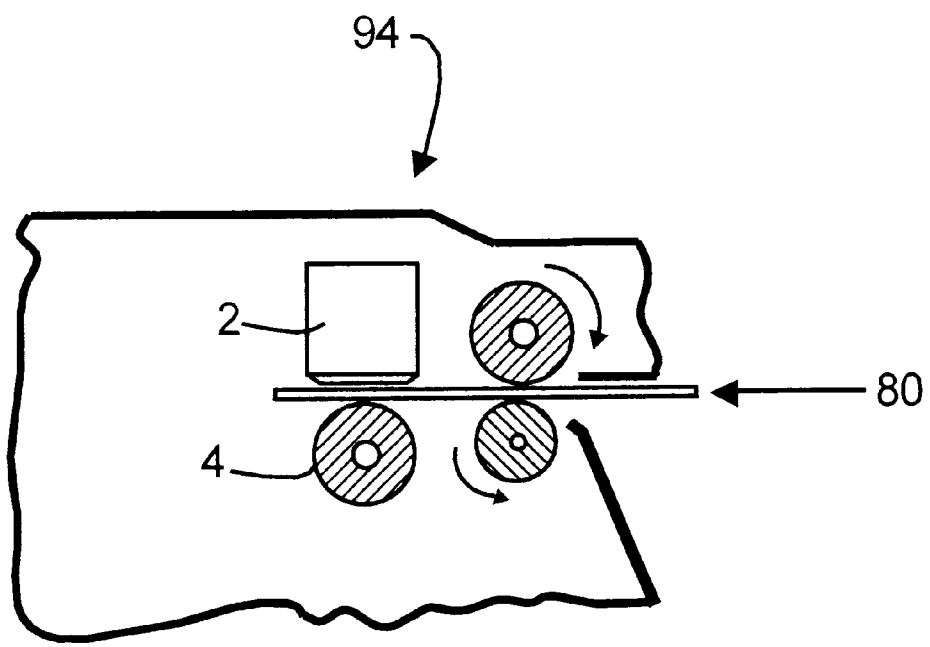
FIG. 10 shows a cross-sectional view of a combined housing of a card scanner and feeder device.

FIG. 9 shows another combined housing 92 for the card scanner 10 and card feeder 30. FIG. 10 shows another combined housing 94. Similar to the previous combined housing go (FIG. 8), the backstop incline 48, and the output rollers 40 and 42 of these combined housings perform the same functions and operate in the same way as the corresponding parts in the card feeder 30 in FIG. 5. Referring to FIG. 9 and/or FIG. 10, in one mode of operation, the input roller 4 is initially stationary. The output rollers 40 and 42 move the card 60 into the nip between the input roller 4 and the scanning module 2. The motor driving the output rollers 40 and 42 then stops. Next, power is applied to the input roller 4, which rotates and moves the card 60 completely across the scanning module 2 and out of the combined housing 92 (or 94 in FIG. 10). In another mode of operation, the output motor does not stop but continues to operate as the output card 60 engages input roller 4, and the output rollers 40 and 42 rotate in synchronization with input roller 4.

Figure 11:
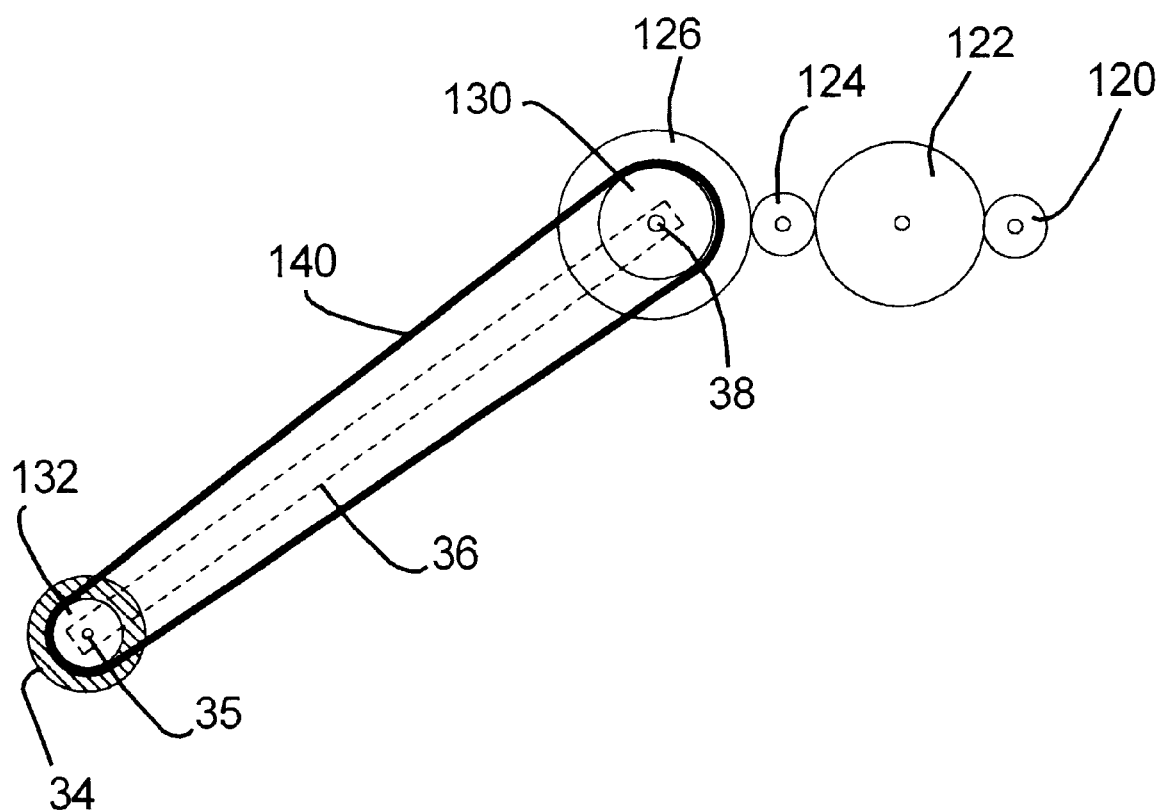
FIG. 11 shows a gear train and pulley system for driving a pickup roller using a motor.

FIG. 11 illustrates an embodiment of a gear train and pulley system for driving a pickup roller 34 using a pickup motor (not shown). The pickup roller 34 is mounted on a swing arm 36. The upper end of the swing arm 36 is pivoted at the swing arm axle 38, and allows the arm to rotate freely about the swing arm axle 38. Gear 126 is fixed to a driver wheel 130 and both rotate in synchronization about the swing arm axle 38. Pickup roller 34 is fixed to a roller wheel 132 and both rotate in synchronization about the pickup axle 35. As power is applied to the pickup motor (not shown), a motor pinion 120 transfers torque to gear 126 by coupling with gear 122 and gear 124. This causes the driver wheel 130 to rotate, and torque is transferred to the roller wheel 132 by means of the pulley belt 140. The resulting torque on the roller wheel 132 causes it to rotate, which in turn rotates the pickup roller 34.

What is claimed:

1. A system for feeding a stack of business cards from an input platform to a scanner, comprising:

a vertically movable pickup roller;

a housing;

a swing arm with an upper and lower end, wherein the housing supports the upper end and the lower end supports the pickup roller above the input platform;

a backstop incline extending from the input platform;

a plurality of output rollers adjacent the top edge of the backstop incline;

a first motor coupled to rotate the pickup roller;

a second motor coupled to rotate the plurality of output rollers;

one or more scanner input rollers with axes parallel to the plurality of output rollers; and wherein the pickup roller rotatably contacts the top card and travels vertically upward when the top card travels up the backstop incline so that the major surface of the card separates from the major surface of the next card in the stack, wherein the edge of the top card slides upwards along the backstop incline until the top card engages the plurality of output rollers, which rotate and push the top card toward the scanner input roller(s), wherein the plurality of output rollers and the scanner input roller(s) can be synchronized or the plurality of output roller can freely rotate when the second motor is cut off.

2. A system for feeding a stack of business cards from an input platform to a scanner, comprising:
   a housing;
   an input platform;
   a vertically movable pickup roller mounted above the input platform;
   a backstop incline extending from the input platform;
   a plurality of feeder output rollers adjacent the top edge of the backstop incline;
   one or more motors coupled to rotate the pickup roller and he plurality of feeder output rollers; and
   one or more scanner input rollers with axes parallel to the plurality of feeder output rollers; and wherein the pickup roller rotatably contacts the top card and travels vertically upward when the top card travels up the backstop incline so that the major surface of the card separates from the major surface of the next card in the stack, wherein the edge of the top card slides upwards along the backstop incline until the top card engages the plurality of feeder output rollers, which rotate and push the top card toward the scanner input roller(s), wherein the plurality of feeder output rollers and the scanner input roller(s) can be synchronized or the plurality of feeder output rollers can freely rotate when power to the feeder output rollers is cut off.

3. The system of claim 2, further comprising a swing arm, wherein the housing supports one end of the swing arm and the other end supports the pickup roller above the input platform.

4. The system of claim 2, further comprising guides mounted on the housing, wherein the guides support the pickup roller above the input platform.

5. The system of claim 2, wherein the motor(s) include first motor coupled to rotate the pickup roller and a second motor coupled to rotate the plurality of feeder output rollers.

6. The system of claim 2, wherein the housing is a combined housing which encloses both the feeder apparatus and the scanner module.

7. A system for feeding a stack of business cards from an input platform to a scanner, comprising:
   a combined housing which encloses both the feeder system and the scanner system;
   an input platform;
   a vertically movable pickup roller mounted above the input platform;
   a backstop incline extending from the input platform;
   a plurality of feeder output rollers adjacent the top edge of the backstop incline;
   one or more motors coupled to rotate the pickup roller and the plurality of feeder output rollers; and
   one or more scanner output rollers with axes parallel to the plurality of feeder output rollers; and wherein the pickup roller rotatably contacts the top card and travels vertically upward when the top card travels up the backstop incline so that the major surface of the card separates from the major surface of the next card in the stack, wherein the edge of the top card slides upwards along the backstop incline until the top card engages the plurality of feeder output rollers, which rotate an push the top card over the scanning module toward the scanner output roller(s), wherein the plurality of feeder output rollers and the scanner output roller(s) can be synchronized or the plurality of feeder output rollers can freely rotate when power to the output rollers is cut off.

8. The system of claim 7, further comprising a swing arm, wherein the housing supports one end of the swing arm and the other end of the swing arm supports the pickup roller above the input platform.

9. The system of claim 7, further comprising guides mounted on the housing, wherein the guides support the pickup roller above the input platform.

10. The system of claim 7, wherein the motors include a first motor coupled to rotate the pickup roller and a second motor coupled to rotate the plurality of feeder output rollers.

* * * * *